(12) United States Patent
Borrill

(10) Patent No.: US 6,918,014 B1
(45) Date of Patent: Jul. 12, 2005

(54) DYNAMIC DISTRIBUTED DATA SYSTEM AND METHOD

(75) Inventor: Paul L. Borrill, Palo Alto, CA (US)

(73) Assignee: VERITAS Operating Corporation, Mountain View, CA (US)

( * ) Notice: Subject to any disclaimer, the term of this patent is extended or adjusted under 35 U.S.C. 154(b) by 0 days.

(21) Appl. No.: 10/679,863

(22) Filed: Oct. 6, 2003

Related U.S. Application Data

(63) Continuation of application No. 09/972,831, filed on Oct. 5, 2001, now Pat. No. 6,631,449.
(60) Provisional application No. 60/238,774, filed on Oct. 5, 2000.

(51) Int. Cl.[7] .............................................. G06F 13/14
(52) U.S. Cl. ...................................................... 711/147
(58) Field of Search ................................ 711/118, 147, 711/144, 145, 170; 370/351

(56) References Cited

U.S. PATENT DOCUMENTS

| | | | |
|---|---|---|---|
| 4,354,229 A | | 10/1982 | Davis et al. |
| 5,761,421 A | | 6/1998 | van Hoff et al. |
| 5,764,982 A | | 6/1998 | Madduri |
| 5,771,349 A | * | 6/1998 | Picazo et al. ............... 713/202 |
| 5,790,553 A | | 8/1998 | Deaton, Jr. et al. |
| 5,802,278 A | | 9/1998 | Isfeld et al. |
| 5,832,195 A | | 11/1998 | Braun et al. |
| 5,928,326 A | | 7/1999 | Boudou et al. |
| 6,012,096 A | | 1/2000 | Link et al. |
| 6,016,478 A | | 1/2000 | Zhang et al. |
| 6,049,823 A | | 4/2000 | Hwang |
| 6,144,992 A | | 11/2000 | Turpin et al. |
| 6,148,383 A | | 11/2000 | Micka et al. |
| 6,167,432 A | | 12/2000 | Jiang |
| 6,173,374 B1 | | 1/2001 | Heil et al. |
| 6,185,618 B1 | | 2/2001 | Brabson |
| 6,189,079 B1 | | 2/2001 | Micka et al. |
| 6,219,710 B1 | | 4/2001 | Gray et al. |
| 6,272,386 B1 | | 8/2001 | McLaughlin et al. |
| 6,275,888 B1 | | 8/2001 | Porterfield |
| 6,304,980 B1 | | 10/2001 | Beardsley et al. |
| 6,314,093 B1 | * | 11/2001 | Mann et al. ................. 370/351 |
| 6,314,491 B1 | | 11/2001 | Freerksen et al. |
| 6,317,438 B1 | | 11/2001 | Trebes, Jr. |
| 6,347,362 B1 | * | 2/2002 | Schoinas et al. ............. 711/147 |
| 6,415,280 B1 | | 7/2002 | Farber et al. |
| 6,434,638 B1 | | 8/2002 | Deshpande |
| 6,567,380 B1 | * | 5/2003 | Chen .......................... 370/238 |
| 6,631,449 B1 | | 10/2003 | Borrill |
| 6,775,258 B1 | * | 8/2004 | van Valkenburg et al. .. 370/338 |
| 2002/0065919 A1 | | 5/2002 | Taylor et al. |
| 2002/0103998 A1 | | 8/2002 | DeBruine |
| 2002/0114341 A1 | | 8/2002 | Sutherland et al. |
| 2002/0143855 A1 | | 10/2002 | Traversat et al. |
| 2002/0147771 A1 | | 10/2002 | Traversat et al. |
| 2002/0147815 A1 | | 10/2002 | Tormasov et al. |

OTHER PUBLICATIONS

Sweazey, Paul and Alan Jay Smith, A Class of Compatible Cache Consistency Protocols and their Support by the IEEE Futurebus, Proc. 13th Ann. Symp. on Computer Architecture, Jun. 3–5, 1986, Tokyo, Japan.*

* cited by examiner

*Primary Examiner*—Kevin L. Ellis
(74) *Attorney, Agent, or Firm*—Meyertons Hood Kivlin Kowert & Goetzel, P.C.; B. Noël Kivlin

(57) ABSTRACT

A system and method for maintaining storage object consistency across a distributed storage network including a migratable repository of last resort which stores a last or only remaining data replica that may not be deleted. The method includes the steps of monitoring data requests to the repository of last resort, deciding whether to move the repository of last resort, and migrating the repository of last resort.

32 Claims, 7 Drawing Sheets

DYNAMIC DISTRIBUTED DATA SYSTEM AND METHOD

CROSS REFERENCE TO RELATED APPLICATIONS

This application is a continuation of U.S. patent application Ser. No. 09/972,831, entitled "Dynamic Distributed Data System And Method", filed Oct. 5, 2001, now U.S. Pat. No. 6,631,449 and claims priority from U.S. Provisional application entitled Extending Snoopy Cache Consistency to Networks, Ser. No. 60/238,774 filed on Oct. 5, 2000, the specification of which is herein incorporated by reference.

BACKGROUND OF THE INVENTION

1. Field of the Invention

The invention relates generally to systems and methods for maintaining storage object consistency across distributed storage networks and more particularly to a dynamic distributed data system and method which provides for minimized latency, reduced complexity and is extensible, scalable and isotropic.

2. Background of the Invention

Processors in a multiprocessor configuration are conventionally designed with a cache. A cache is a type of memory that is smaller and faster than other memory types. Caches are used by processors to store data retrieved from main memory. When a processor requests data and the data is not in its cache, the main memory supplies the data and a copy is then stored in the processor cache. A subsequent request from the processor for the same data results in the cache providing the data instead of the main memory because the cache is faster.

Since each processor has a cache with its own copy of data, data inconsistencies can result. For example, consider two processors A and B, each with caches with the same data. If processor A updates its cache data while processor B does not, then A and B have caches with inconsistent data. Furthermore, computations by B using its cached data will result in other data inconsistencies. The inconsistent data between caches is called the cache coherence problem.

The cache coherence problem exists at all levels in a computer memory hierarchy such as in multiple levels of caches, main memory, and secondary and tertiary storage (typically disks and tapes).

Prior solutions to the cache coherence problem typically fall into two categories. One known solution is the snoopy cache coherence protocol. In accordance with the snoopy cache coherence protocol, each processor "snoops" or eavesdrops on a shared interconnect, such as a bus or ring, to check if data blocks shared with other caches have been changed or modified, for example. If a snooping processor discovers that its copy of data is out-of-date, then the snooping processor will invalidate its data to force a fetch of the data from the memory or another cache on a subsequent data request. A typical snoopy cache coherence protocol solution includes the MOESI model as is well known in the art.

A uniquely identified data block 100 is identified with an address tag 105 as shown in FIG. 1. In accordance with the MOESI model, a valid bit 110 indicates the state of data block 100 in the cache of the snooping processor. Such states include valid and invalid states. Other state bits such as an owned bit 120 and a shared bit 130 are conventionally used to represent states of data block 100. Owned bit 120 is used to indicate ownership, that is, permission to write, of the data block 100. Shared bit 130 is used to indicate that the data block 100 is shared, that is, other caches have a copy.

The three state bits including the valid bit 110, the owned bit 120, and the shared bit 130 yield eight possible states. The MOESI model includes a modified (M) state, an owned (O) state, an exclusive (E) state, a shared (S) state, and an invalid (I) state. These state bits define whether cache data has been modified, is owned, is exclusive, is shared, or has invalid data. The other three possible states are not defined in a standard MOESI implementation.

While the snoopy cache coherence protocol has been used in a system of connected processors on a shared interconnect, performance is typically limited to an optimum number of processors connected to the shared interconnect. The optimum number of processors is determined by the traffic handling capabilities of the shared interconnect. Thus the snoopy protocol is not scalable to arbitrarily large systems of connected processors. Additionally, the snoopy protocol is not extensible without modifying existing resources, because a solution to the scalability problem includes changing the bandwidth of the shared interconnect.

A second known solution to the cache coherence problem includes a directory-based cache coherence protocol. In the directory-based cache coherence protocol, a processor performs a table lookup in a directory when data in its cache is to be updated. Typically, the directory stores a table of cache locations that contain the same data block as the data block to be updated by the requesting processor. Data inconsistency arises because the data update may cause data stored in other caches or memory to become inconsistent. To resolve this, the other caches are notified of the impending data update and those copies are invalidated. Then the requesting processor can safely perform the data update.

A directory-based scheme is not scalable or extensible, since each cache needs to keep a directory entry for other interested caches in the system and as new caches are added, the existing tables must be expanded. Additionally, table lookups require more time as more processors are added to the system because added table entries for the added processors must also be checked. This increased lookup time leads to increased latency throughout the system thereby limiting the effectiveness of the directory-based cache coherence protocol. The directory-based cache coherence protocol also requires increased memory for the directory (which can be distributed) as the system of connected processors grows.

A generalization of a coherent cache system where the system contains only cache memories and discards the requirement for main memory by requiring at least one of the caches to keep data persistent is called a "main-memoryless" system or a "cache only memory architecture" (COMA).

When a system of storage elements, computer memory, disk devices, network switches, routers, or other computing system devices are networked together (hereinafter network of attached devices), a data inconsistency problem similar to the cache coherence problem results. Regardless of the extent of the network, common data residing on any device on the network can become inconsistent.

Additionally, the network of attached devices typically includes devices from various manufacturers, each of which implements and configures its devices differently. This leads to great complexity and extremely high costs in administering the network of attached devices. Adding a new device to the network of attached devices increases the complexity of the network of attached devices by requiring increased administration. The administration cost increases with increasing complexity because human capacity is finite and more personnel are required for the administration of each new device. This problem can be mitigated if the network is made isotropic, that is, the ability of the network to look the same to any attached device looking into the network from any direction. In such manner a single administrator with finite capacity can administer an indefinite size network of attached devices.

What is needed therefore is a system and method for maintaining data consistency which provides for minimized latency, reduced complexity and is extensible, scalable, and isotropic.

SUMMARY OF THE INVENTION

The invention provides a dynamic distributed data system and method which includes at least one migratable repository of last resort (RLR). The RLR provides a facility for storing a last or only remaining data replica that may not be deleted. In this manner the RLR ensures the persistence of the data replica. the process of the invention monitors data requests to the RLR and determines whether to migrate the RLR to a requesting node.

DETAILED DESCRIPTION OF THE INVENTION

The system and method of the invention maintain storage object consistency in a network while providing for extensibility, scalability, and minimized latency. The invention integrates aspects of the snoopy protocol with aspects of the directory-based protocol and extends an integrated protocol to arbitrary network topologies. Further a facility known as a Repository of Last Resort (RLR) enables persistence as described herein.

The invention can be implemented using any known communication paths such as busses, rings, point-to-point links, virtual channels including Fibre Channel, TCP/IP packet-switched networks including Asynchronous Transfer Mode (ATM), and cellular packet radio. The efficiency of the snoopy protocol is combined with the distribution capability of the directory-based protocol thereby providing for a system that is both extensible and scalable.

The snoopy protocol is used over a dynamically created and maintained tree of interested nodes. The architecture operates-in a manner-somewhat similar to cellular automata, where each node knows only about its own storage objects and its connections to its neighbors. This results in reduced complexity for deployment, administration, and operation of dynamic distributed data systems.

Further, such a peer to peer or decentralized nature of the integrated protocol of the invention reduces the complexity of implementing the integrated protocol by allowing every node in the system to be viewed isotropically. In this manner nodes can be added to the system indefinitely without further need for administration except for physically installing the node.

Figure 1:
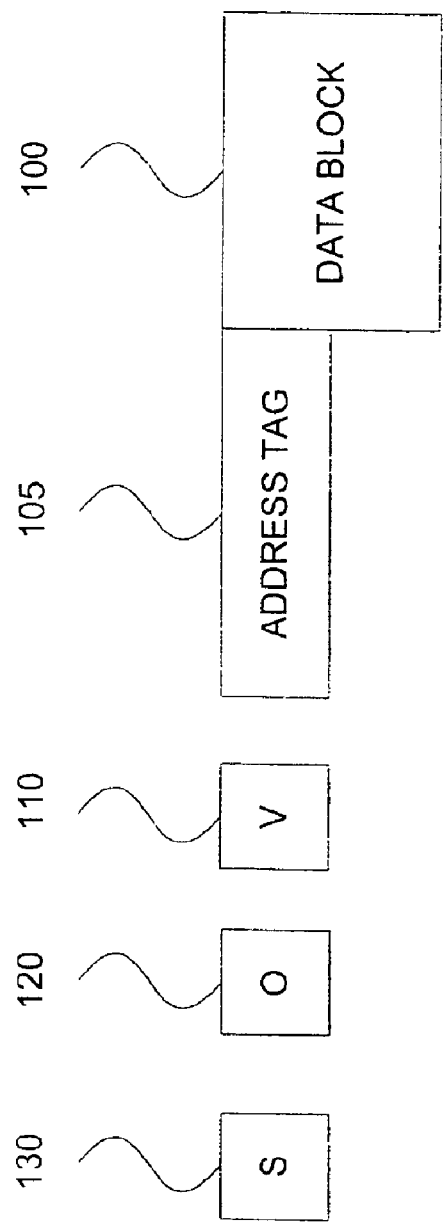
FIG. 1 is a block diagram of a data block and associated state bits.
Figure 2:
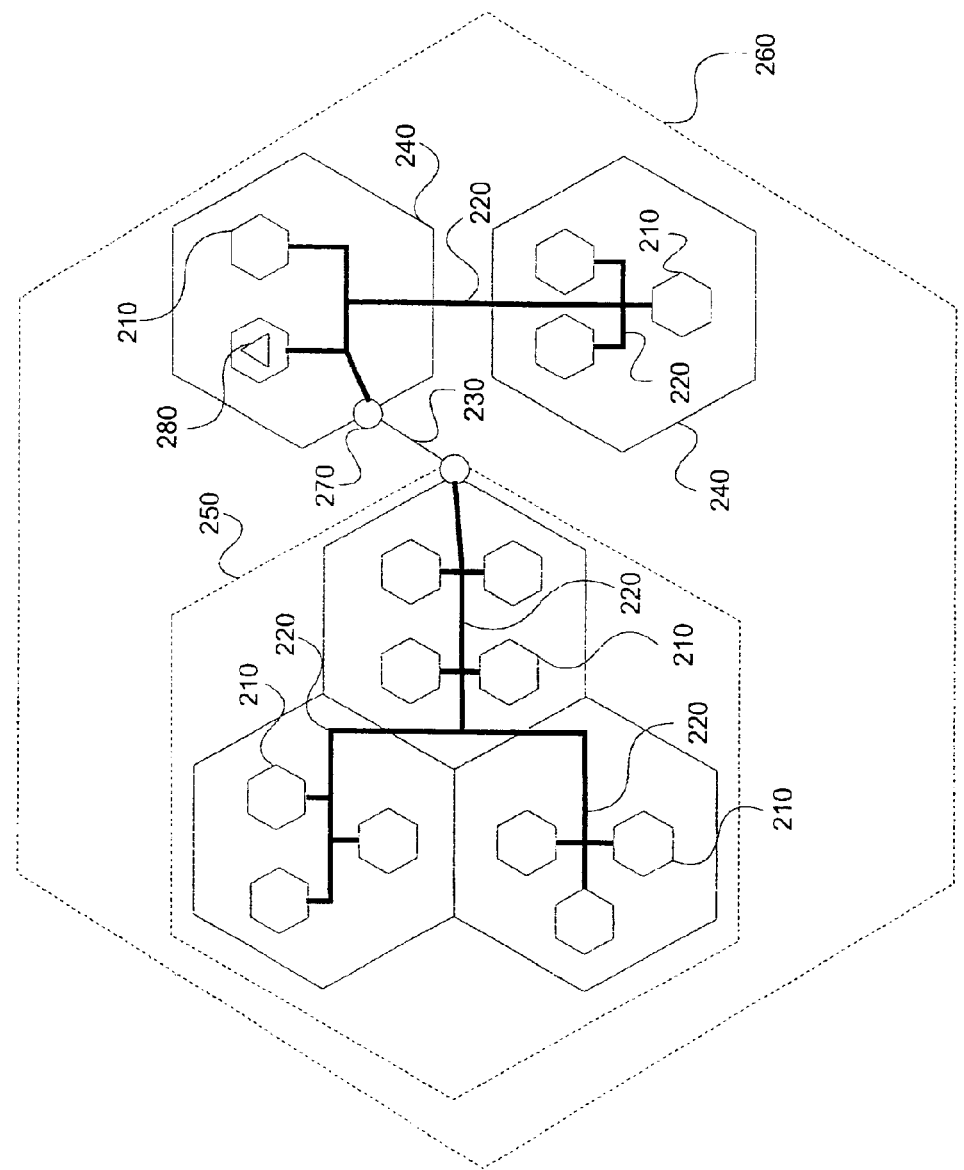
FIG. 2 is a block diagram of a system architecture in which the invention is practiced.

The invention may be practiced in a system architecture as illustrated in FIG. 2 including such items as a plurality of nodes 210, shared interconnects 220, links 230, clusters 240, compound clusters 250, and super-clusters 260.

Figure 3:
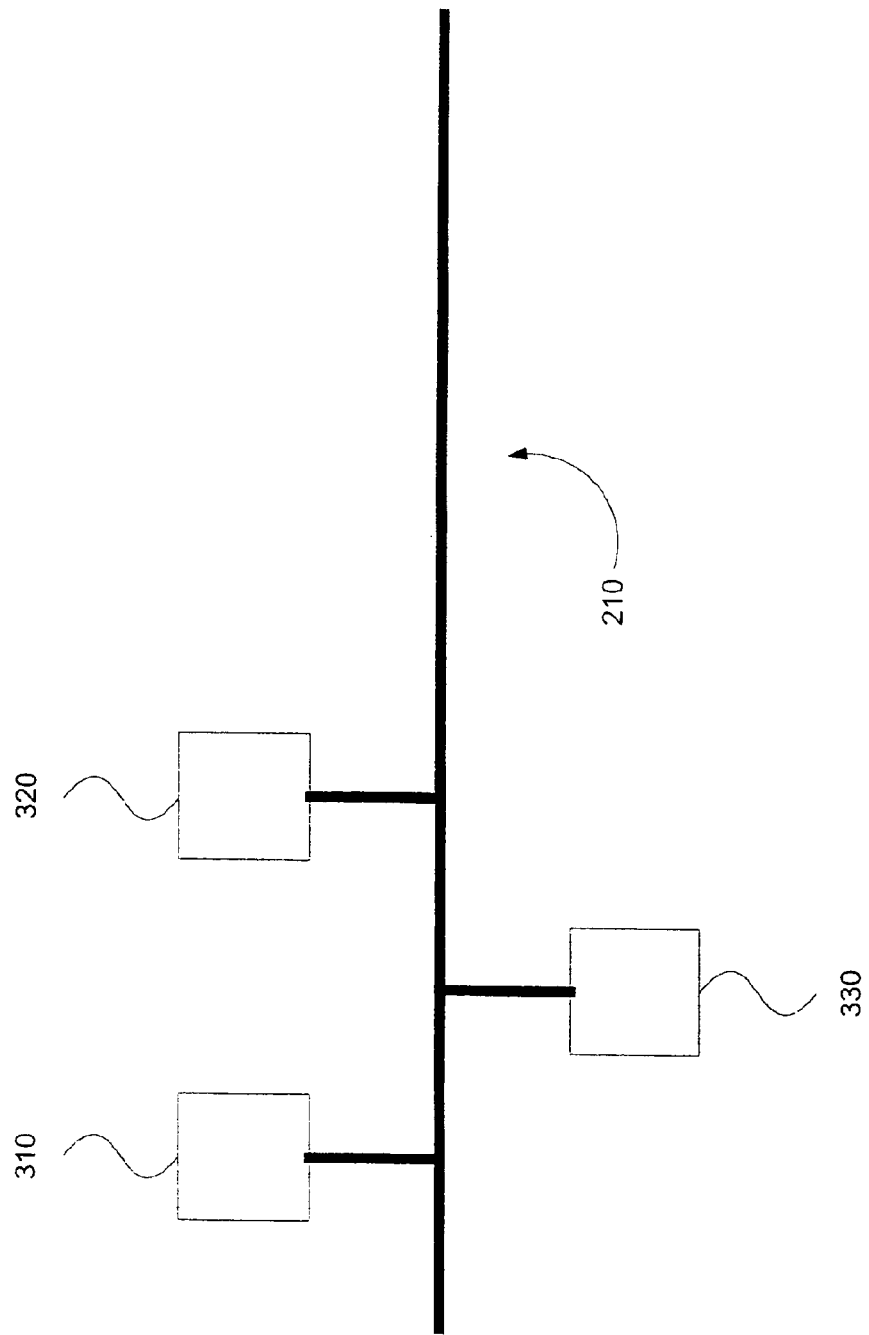
FIG. 3 is a block diagram of a node in accordance with the invention.

Nodes 210 typically include at least a processor 310, a storage 320 such as memory or disk, and one or more network interfaces 330 as illustrated in FIG. 3. Nodes 210 (FIG. 2) are connected to each other by network connections or links 220 forming a cluster 240. Network connections 220 typically include communication paths such as networks, sub-networks, busses, rings, and cellular packet radio.

Point-to-point links 230 can also provide communication between nodes 210 rather than network connections 220. Examples of point-to-point links include virtual channels such as Fibre Channel, TCP/IP and packet-switched networks.

As will be appreciated by one skilled in the art upon having read the detailed description herein, clusters 240, compound clusters 250, and super-clusters 260 can each be viewed as a node 210. As such, references hereinafter to node 210 include those logical constructs. Furthermore, in accordance with the invention, all nodes 210 behave the same and no node 210 requires human intervention.

Viewing a node at the compound cluster 250 level, the eavesdropping nature of the snoopy protocol on the network connection 220 allows for local broadcasts within the node comprising compound cluster 250. Thus, within the node comprising compound cluster 250, snoopy protocols are used in the invention to maintain data consistency in their typical expression.

Between nodes 210, broadcasts can saturate the network connection 220. Therefore multicast operations, which include messages to a subset of a broadcast group, are used in structures larger than the available bandwidth can support. Such multicast operations include partite addressing. In partite addressing, all destinations are grouped into partitions within which network connections 220 can provide local broadcasts. When using partite addressing, communication begins at an originating node 210 and at a maximum, traverses one communication path to each node 210 in the compound cluster 250.

Multicast operations can also be implemented using tree forwarding. In tree forwarding, communication begins at an originating node 210 and traverses a spanning tree to each node 210 in a communication path. The spanning tree is defined by a set of communication links defining a communication path between multiple nodes 210 that does not include loops or cycles. An example of such loops or cycles includes a communication path that originates and ends at the same node without using the same communication path.

The integrated protocol utilizes a facility called the repository of last resort (RLR). The RLR provides a facility for storing a last or only remaining copy of a data replica that may not be deleted. In this manner the RLR ensures the persistence of the data replica.

FIG. 2 shows RLR 280 in a first node 210. In accordance with one embodiment of the invention, RLR 280 may migrate from the first node 210 to another node 210.

The RLR 280 may end its life by an explicit instruction to delete the data by an owner who has the authority, by migration to another physical location in another node 210, or by transfer of ownership through some input/output device to another storage system not participating in the system.

Every node 210 has an associated Routing Table. The Routing Table provides a forward path, that is, a path for transactions destined to the RLR 280 to use. Such transactions include data consistency related messages between all of the nodes 210. Such transactions also include flush operations by nodes 210 which no longer have space to retain modified data. Such transactions further include a request ownership transaction and a response transaction as further described herein.

The Routing Table provides a pointer indicating a direction to the RLR 280. As such, in terms of network topology, each node 210 knows only about itself and its neighbors.

Figure 4:
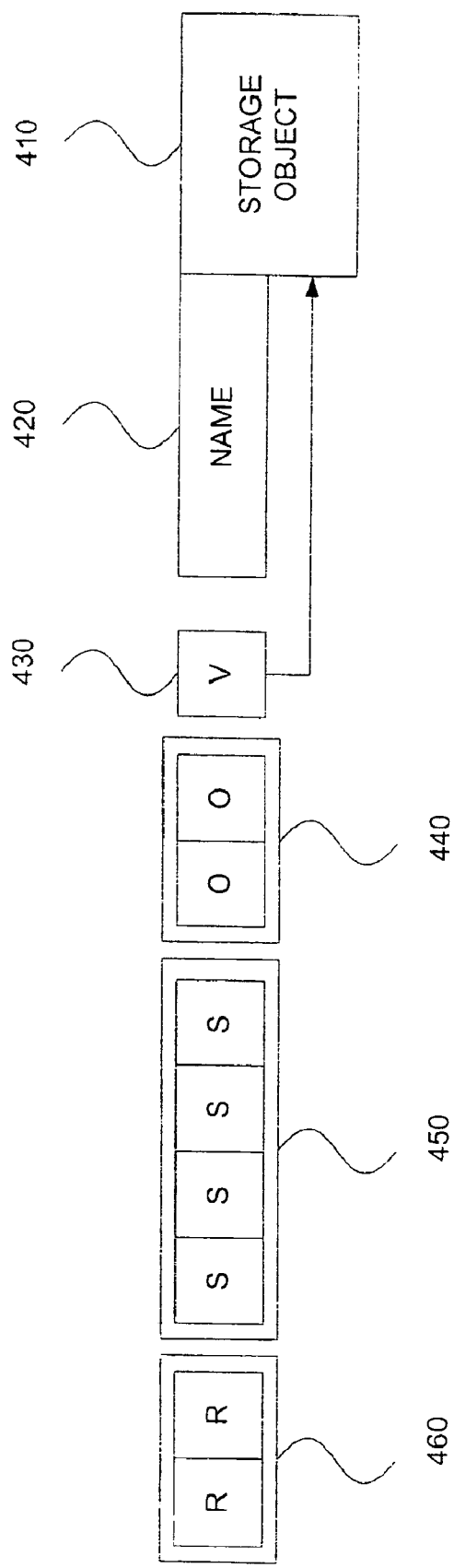
FIG. 4 is a block diagram illustrating a Routing Table in accordance with one embodiment of the invention.

FIG. 4 shows a storage object 410 having a name tag 420 and associated state bits 440 (ownership pointer), 450 (shared direction bits), and 460 (RLR pointer) for the Routing Table. Storage objects include any consistent storage entity such as a file, a block or an extent which may need to be updated atomically. Routing Table bits 460 show a Routing Table with a single RLR. The Routing Table bits 460 define four ($2^2=4$) possible directions, or forward paths, to RLR 280. Those skilled in the art will appreciate that any number of Routing Table bits 460 can be used as needed to define any number of directions. Additional sets of Routing Table bits 460 can be used to point to additional RLRs 280.

Figure 5:
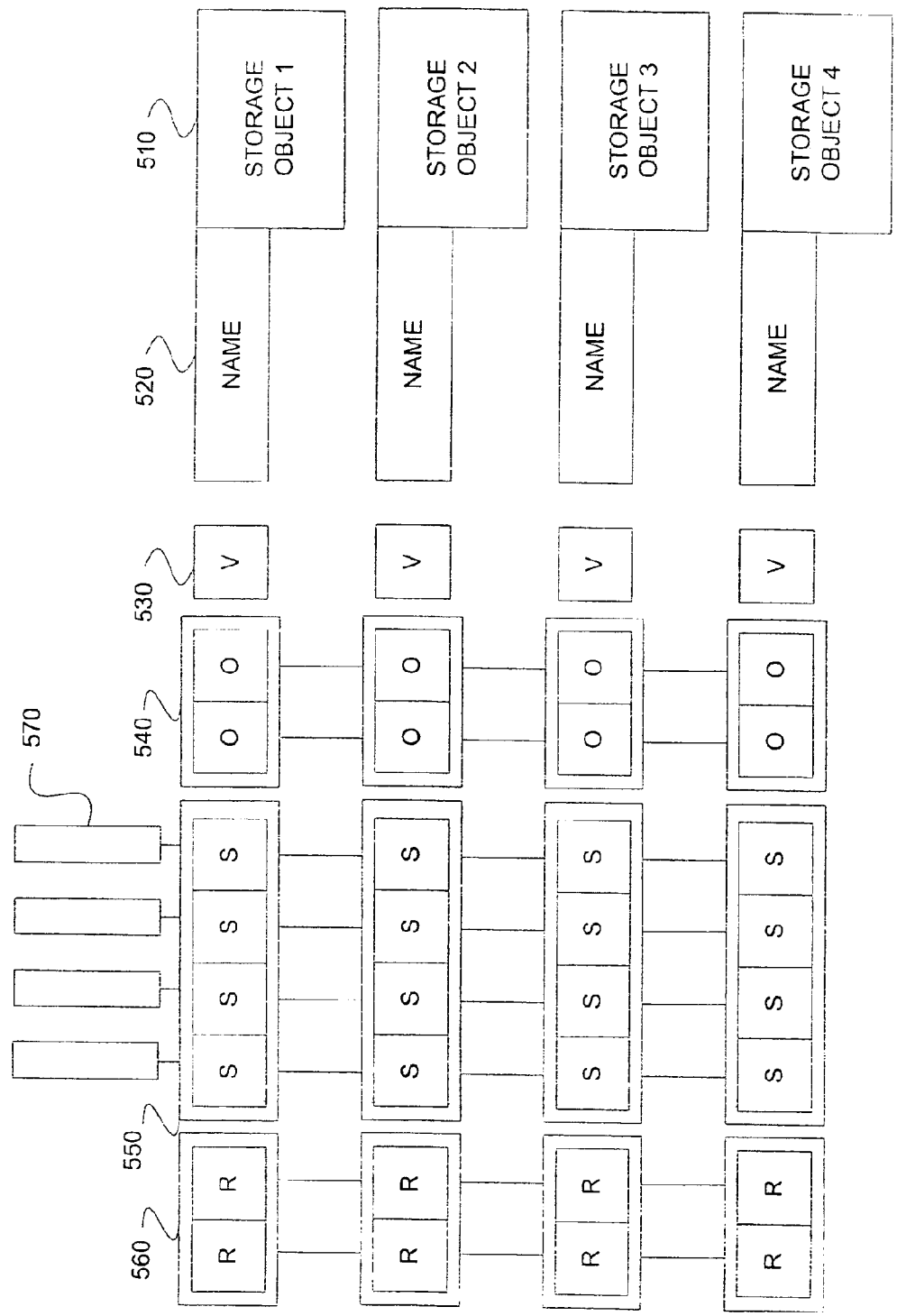
FIG. 5 is a block diagram illustrating an alternative Routing Table in accordance with an alternative embodiment of the invention.

FIG. 5 shows a storage object 510 having a name tag 520 and associated state bits 530, 540, 550, and 560 for each entry in the Routing Table. The Routing Table stores multiple RLR pointers 560 for each RLR required per storage object entry in the Routing Table.

The Routing Table includes both a direction of shared copies (four are shown corresponding to up to four links to other nodes 210) and a direction of a unique. owner using shared bits 450 and owned bits 440 (FIG. 4) respectively. The valid bit 530, together with the owned bits 540 and shared bits 550 implement the MOESI state bits for the cache coherence protocol.

With continued reference to FIG. 5, a channel ID, such as an IP address (not shown), for each path, used for network routing, is stored in a pointer field 570. Pointer field 570 can represent any number of links to neighbor nodes 210. The owned bits 540 correspond to one of the directions (or itself if zero, indicating that this node is the onwer), indicating which path (pointer field 570) leads to the currently owned copy of the data (which is an exclusive property in the MOESI model).

The shared bits 550 indicate which of the directions lead to a shared copy of the data, that is for example, zero indicates that the data is not shared in that direction and one indicates that the data is shared in that direction.

In the network of attached devices, basic mechanisms are required to manage the resources of the network. Publish, unpublish, subscribe, and unsubscribe form such basic mechanisms for the management of resources according to the invention. These mechanisms provide a means of managing operations such as initial configuration and reconfiguration of network resources.

Publish includes a process used by RLR 280 to announce the availability of a storage object to the network of attached devices. When storage objects are published, a spanning tree (not shown) is constructed for performing the multicast operations of the invention. Spanning trees may be constructed using any well known algorithm. Each node 210 maintains a direction or forward path for all published resources in the associated Routing Table. By following the reverse path, the spanning tree is traversed to the published resources.

Subscribe includes a process used by nodes 210 to request access to a published storage object. The subscription process traverses the spanning tree to the RLR 280 using the associated Routing Tables for each node 210 that it traverses. The RLR 280 then validates the request and provides acknowledgement to the requesting node 210. Once the node 210 has subscribed to a storage object, the node 210 is free to access the closest available copy in the spanning tree and cache a copy.

Unpublish includes a process used by RLR 280 to recall publication of a storage object and deconstruct the associated spanning tree. Unsubscribe includes a process of revoking access rights to a subscribed storage object. The nodes 210 with shared copies of that storage object respond with acknowledgment of the unsubscribe process, and cease access to the storage object.

In accordance with the invention, multicasts over the physical or virtual paths within the network use a situational combination of multicast methods including partite addressing, tree forwarding, and snoopy protocols and locally limited broadcasts within nodes 210 connected to a shared interconnect, such as a subnet.

Figure 6:
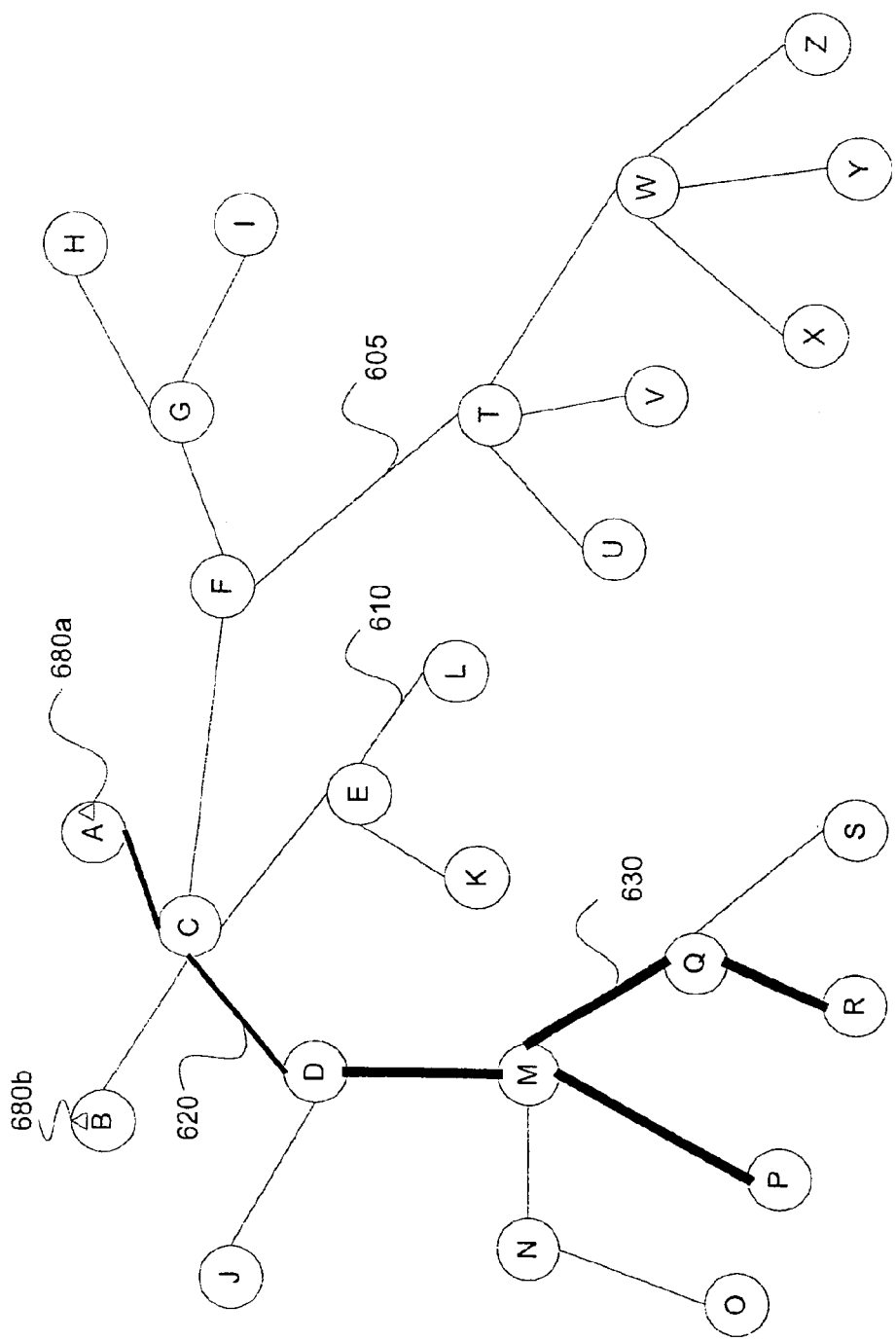
FIG. 6 is a diagram illustrating a spanning tree.

With reference to FIG. 6, an exemplary system in accordance with the invention is shown including a plurality of nodes labeled A through Z and spanning tree paths shown as connecting lines 605, 610, 620, and 630. Nodes A and B contain the RLRs 680a and 680b for storage objects 1 and 2 (not shown), respectively.

In the case where a node D requests ownership of storage object 1, a request ownership transaction is routed along paths DC and CA to the RLR 680a following the paths stored in Routing Tables of nodes D and C, respectively. Node A services the request and issues a response that progresses to node D via node C, each node caching a copy as the storage object passes through it. Node A marks the path state AC as the owner direction using owner bits 440/540 (FIG. 4, FIG. 5) in its associated Routing Table and node C marks the path state CD as the owner direction using owner bits 440/540 in its associated Routing Table. Future transactions are routed toward the owner node D rather than the RLR 680a. If node C now receives a request transaction for storage object 1 (e.g., from the direction of node B, E, or F), the request will be routed down the owner path CD rather than the RLR path CA to ensure that the latest version of the data is obtained.

In another aspect, the system and method of the invention include a combination of transactions that share the same path. For example with continued reference to FIG. 6, nodes P and Q could concurrently request a copy of storage object 1. The transactions are routed along paths PM and QM respectively toward RLR 680a. The requests are combined into a single request (within a request-response time interval) where they meet, at node M, and are passed along path MD to the owner node D. If the requests are not received by node M concurrently, the second received transaction need not be sent from node M to node D since the first transaction for storage object 1 is already outstanding. The response from node D progresses along path DM to node M, where it is split into two responses, one for each of the two requests, one to node P and one to node Q.

In accordance with the invention, transactions for storage object 1 need not progress all the way to RLR 680a that contains a valid copy of storage object 1. For example, in the case where node D is the owner of storage object 1 and nodes P and Q have a copy, then a request for storage object 1 by node R will be routed toward the RLR 680a along path RQ. Since node Q has a copy of storage object 1, it will supply the data to node R and mark path QR as a sharing path in the node Q associated Routing Table. Nodes D, P, Q, M, and R now form a multicast group for storage object 1.

In accordance with the invention, multicast group routing information is distributed in the network as routing and state information at each node 210. As a response transaction progresses away from the RLR 280 or owner, following the reverse path, each node 210 updates the state of the local links in its subtree. Reverse path state and routing information is used for multicast operations.

For example, in a case where node D decides to update storage object I the transaction is routed along path DM, which is marked as a sharing path in node D. Similarly, the transaction is routed along paths MP, MQ, and QR.

With continued reference to FIG. 6, lines 610 include dormant paths, that is, paths for which a connecting node possesses no data information. However in accordance with the invention, all nodes 210 possess the name tag 420/520 along with a Routing Table entry of each storage object, which is a means by which any node can gain access to the storage object. As each storage object is created, the name tag 420/520 is published.

When a transaction is generated by a node) and all paths are dormant for that storage object, the transaction is routed in the direction as specified by the owner direction in the associated Routing Tables of each node.

Lines designated 620 include active paths, that is, ones for which routing as well as data exists in a connecting node Routing Table, but the data may not be valid. Lines designated 630 include live paths, that is, ones for which valid routing and valid data exists in connecting Routing Table and to which updates should be applied if changes are made to the storage object. Consistency threatening transactions must traverse all live path lines 630 but need not traverse active path lines 620 and dormant path lines 610. For example, an invalidate message generated in sub-tree D, M, P, Q, and R for storage object 1 need not progress beyond node D since path DC does not connect to nodes which are actively sharing that storage object.

Figure 7:
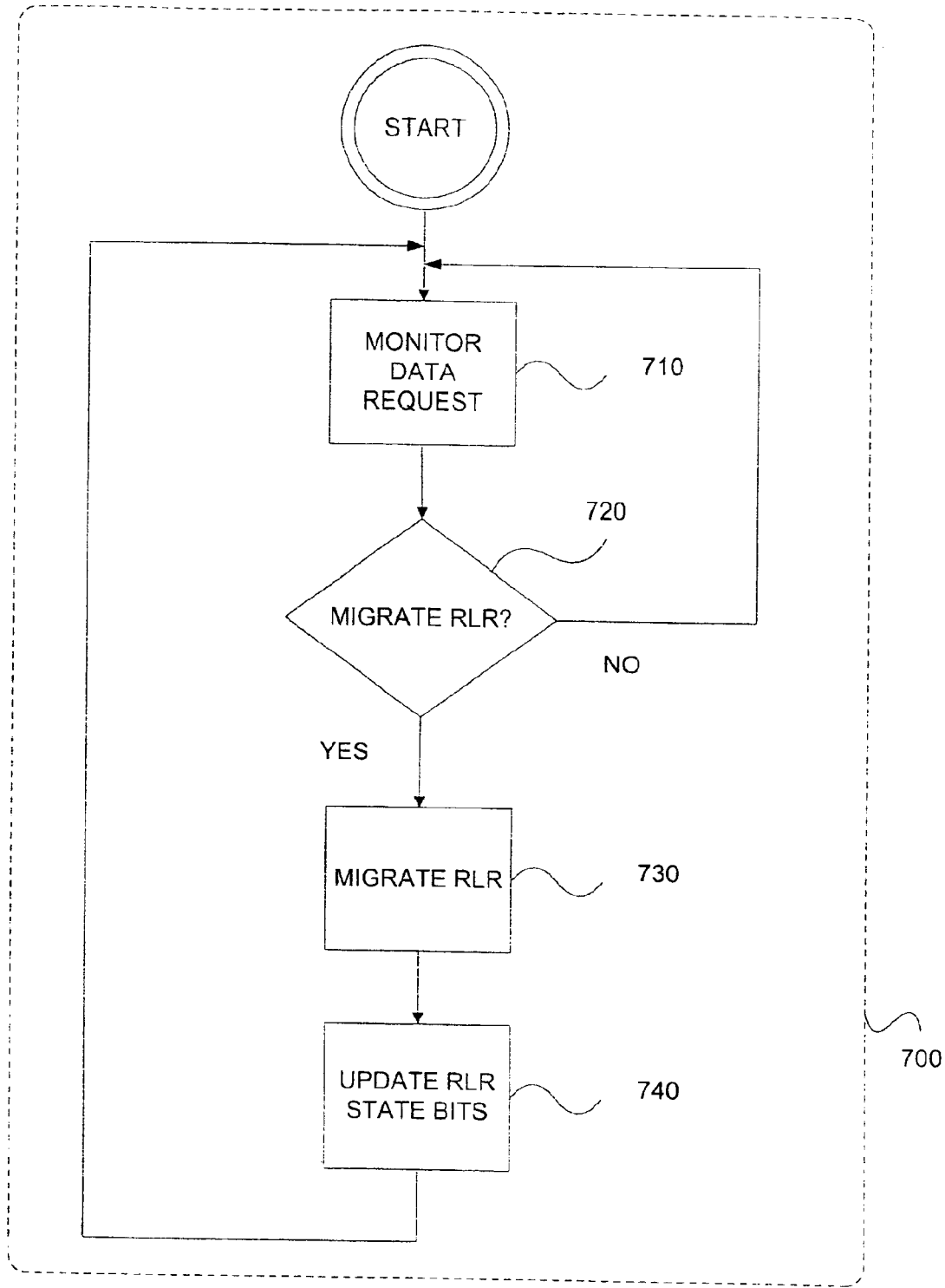
FIG. 7 is a flow diagram illustrating the method of the invention.

With reference to FIG. 7, the method 700 of the invention includes a step 710 in which data requests to the RLR 280 are monitored. In a step 720, a decision is made whether to migrate the RLR 280. If the RLR 280 is not migrated, the process returns. to step 710. If, on the other hand, a decision is made to migrate the RLR 280 in step 720, then in a step 730 the RLR 280 is migrated and in a step 740 the RLR state bits in the subtree of the node to which the RLR 280 is migrated are updated.

In one embodiment of the method 700 of the invention, the determination made in step 720 includes whether the data is the least recently used (LRU) data. In a case where the data is the LRU data, then the RLR 280 is migrated in step 730 to node 210 where the data has been more recently used.

In another embodiment of the invention, an administrator determines in step 720 whether to migrate the RLR 280. Such a determination is made based upon criteria such as the level of activity in an area of the network including the RLR 280.

Several embodiments are specifically illustrated and/or described herein. However, it will be appreciated that modifications and variations are covered by the above teachings and within the scope of the appended claims without departing from the spirit and intended scope thereof.

What is claimed is:

1. A system comprising:
   a plurality of connected nodes; and
   a storage object,
   wherein each node of the plurality of connected nodes is configured to maintain a storage object routing table;
   wherein a first node of the plurality of connected nodes is further configured to:
      identify one or more neighbor nodes of the first node;
      send a message to each neighbor node of the one or more neighbor nodes, indicative of an availability of the storage object at the first node; and
   wherein each neighbor node of the one or more neighbor nodes is further configured to:
      create an entry for the storage object within a storage object routing table at the neighbor node in response to the message;
      store an indication of a path to the first node within the entry.

2. The system as recited in claim 1, wherein the message is sent during a publish process for the storage object.

3. The system as recited in claim 1, wherein the one or more neighbor nodes are selected by the first node from a spanning tree for the plurality of connected nodes.

4. The system as recited in claim 3, wherein the plurality of connected nodes comprise three or more connected nodes, wherein each neighbor node of the one or more neighbor nodes is further configured to propagate a message indicative of the availability of the storage object to an additional node selected from the spanning tree.

5. The system as recited in claim 1, wherein the first node is a repository of last resort for the storage object.

6. The system as recited in claim 1, wherein the storage object is a file.

7. The system as recited in claim 1, wherein the storage object is an extent.

8. The system as recited in claim 1, wherein the storage object is a data block.

9. The system as recited in claim 1, wherein each node of the plurality of connected nodes comprises a cluster of connected devices, wherein each device of the cluster of connected devices includes at least a processor, a disk and a network interface.

10. The system as recited in claim 1, wherein the message is sent over a virtual channel.

11. The system as recited in claim 1, wherein the message is sent over a TCP/IP packet-switched network.

12. The system as recited in claim 1, wherein the message is sent using partite addressing.

13. The system as recited in claim 1, wherein the message is sent using a multicast operation.

14. The system as recited in claim 1, further comprising a plurality of additional storage objects, wherein the storage object routing table at each node of the plurality of connected nodes includes a plurality of entries, and wherein each entry of the plurality of entries includes an indication of a path towards a repository of last resort for a corresponding storage object.

15. The system as recited in claim 14, wherein each entry of the plurality of entries includes an indication of a path towards a shared copy of the corresponding storage object.

16. The system as recited in claim 14, wherein each entry of the plurality of entries includes an indication of a path towards an exclusive owner of the corresponding storage object.

17. The system as recited in claim 14, wherein each entry of the plurality of entries includes an indication of a validity of a cached copy of the corresponding storage object.

18. A method comprising:

maintaining a storage object routing table at each node of a plurality of connected nodes;

identifying one or more neighbor nodes of a first node of the plurality of connected nodes;

sending a message to each neighbor node of the one or more neighbor nodes from the first node, indicative of an availability of the storage object at the first node;

creating an entry for the storage object within a storage object routing table at each neighbor node of the one or more neighbor nodes; and storing an indication of a path to the first node within the entry.

19. The method as recited in claim 18, wherein the message is sent as part of a publish process for the storage object.

20. The method as recited in claim 18, wherein the one or more neighbor nodes are selected by the first node from a spanning tree for the plurality of connected nodes.

21. The method as recited in claim 18, wherein the first node is a repository of last resort for the storage object.

22. The method as recited in claim 18, wherein the storage object is a file.

23. The method as recited in claim 18, wherein the storage object is an extent.

24. The method as recited in claim 18, wherein the storage object is a data block.

25. The method as recited in claim 18, wherein each node of the plurality of connected nodes comprises a cluster of connected devices, wherein each device of the cluster of connected devices includes at least a processor, a disk and a network interface.

26. The method as recited in claim 18, wherein the message is sent over a virtual channel.

27. The method as recited in claim 18, wherein the message is sent over a TCP/IP packet-switched network.

28. The method as recited in claim 18, wherein the message is sent using partite addressing.

29. The method as recited in claim 18, wherein the storage object routing table at each node of the plurality of connected nodes includes a plurality of entries, and wherein each entry of the plurality of entries includes an indication of a path towards a repository of last resort for a corresponding storage object.

30. The method as recited in claim 29, wherein each entry of the plurality of entries includes an indication of a path towards a shared copy of the corresponding storage object.

31. The method as recited in claim 29, wherein each entry of the plurality of entries include an indication of a path towards an exclusive owner of the corresponding storage object.

32. The method as recited in claim 29, wherein each entry of the plurality of entries include an indication of a validity of a cached copy of the corresponding storage object.

* * * * *